Figure 1:
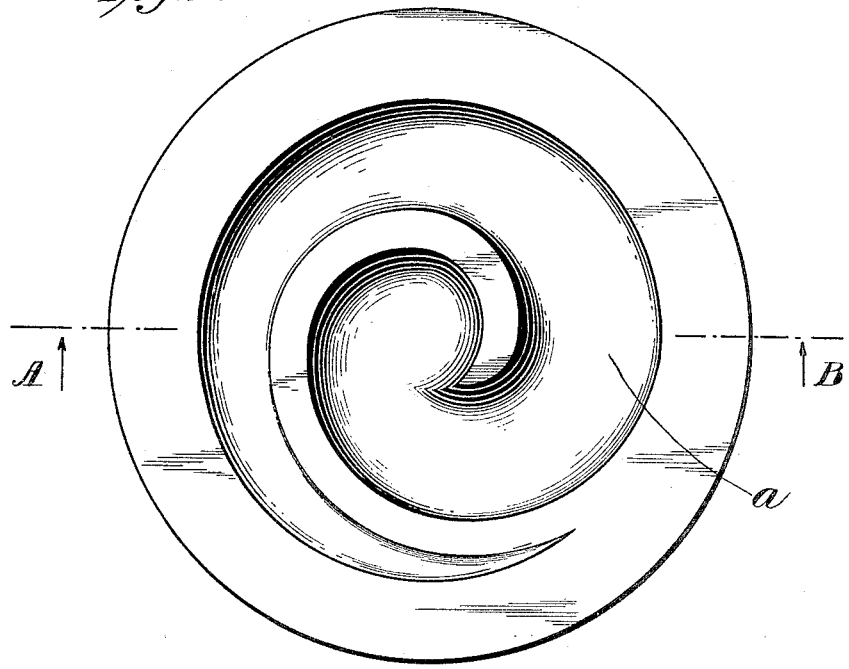

M. M. GILLAM.
NUT CRACKING DEVICE.
APPLICATION FILED FEB. 27, 1914.

1,107,288.

Patented Aug. 18, 1914.

Attest:

Manly M. Gillam, Inventor:

UNITED STATES PATENT OFFICE.

MANLY M. GILLAM, OF FLUSHING, NEW YORK.

NUT-CRACKING DEVICE.

1,107,288.        Specification of Letters Patent.        Patented Aug. 18, 1914.

Application filed February 27, 1914. Serial No. 821,537.

*To all whom it may concern:*

Be it known that I, MANLY M. GILLAM, a citizen of the United States, residing in Flushing, Long Island, in the county of Queens and State of New York, have invented certain new and useful Improvements in Nut-Cracking Devices, of which the following is a specification.

My invention has relation to a device to facilitate the cracking of nuts consisting of a metal form adapted to be easily held in position on a table or other support or on the knee of the person who does the cracking, if so desired, in the face of which said metal form is a depression, channel or groove of a curved shape and graduated or tapered both in depth and in width in the same or a common direction. The said depression, channel or groove of varying width and depth, with its comparatively sharp curves adapts the device to accommodate nuts of any size or shape of the varieties or kinds usually cracked with a blow for eating purposes, such as butter-nuts, black and English walnuts, Brazil nuts, hickory nuts or shellbarks, pecans, filberts, hazel nuts and the like, and to support them in proper position to receive the cracking blow. If desired the inside of said depression, channel or groove may be stepped or terraced at intervals to afford a level base on which the nut to be cracked may rest, or the inner walls of the said depression, channel or groove may be roughened or corrugated to assist in holding the nut more firmly in place to receive the cracking blow. In using this device the nut is placed in the said depression, channel or groove and preferably pushed or pressed to a point where the opposing walls will engage the nut and tend to hold it in place. A sufficient portion of the nut will be exposed above the face of the device to receive an effective cracking blow, but not enough to permit a careless blow to crush the nut to the serious injury of the contained kernel or meat, or to permit any considerable portion of the shell to fly about. At no time need the hand or thumb or any finger of the operator be exposed to danger from the cracking blow. The graduated or tapered form of the said depression, channel or groove also facilitates the removel of the cracked nut by usually permitting it to be slipped in the direction of a greater width, while in any case there is ample room either on one side or on both sides of the cracked nut to permit it to be easily lifted out or removed.

Since in many instances it will be desirable to support this device, when in use, on the knee of the operator I prefer to give a curved or saddle-like form to that portion of the said device that is opposite to the face containing the said depression, channel or groove, leaving nevertheless sufficient of the said portion parallel to the face of the said device to permit it to be properly sustained when in use on a table or other plane surface.

The nature and scope of my present invention will be more fully understood from the following description taken in connection with the accompanying drawings forming part hereof in which—

Figure 2:
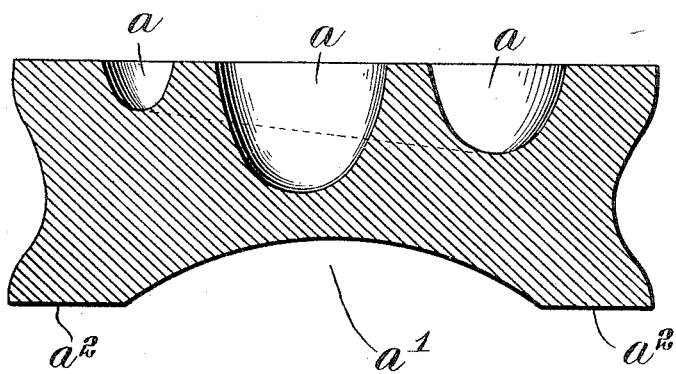

Figure 1 is a view of the face of the said device; and Fig. 2 is a view of a cross section of the said device on the line A. B. as shown in Fig. 1.

Referring to the drawings, $a$ in Figs. 1 and 2 represents the said depression, channel or groove; $a^1$ represents the curved or saddle-shaped part and $a^2$ represents the portions parallel to the face of the device on which it may rest on a plane surface.

It will be obvious that the circular form given to this device in the drawings may be varied without departing from the spirit or the real scope of my invention and hence I do not wish to be understood as limiting myself to that form.

Having thus described the nature and objects of my invention, what I claim as new and desire to secure by Letters Patent is:—

1. A nut cracking device consisting of a metal form having in one face a depression, channel or groove graduated or tapered both in width and in depth in a common direction, substantially as and for the purposes described.

2. In a nut cracking device a metal form having in its face a curved depression, channel or groove graduated or tapered in the direction of its least depth and with the base saddle shaped in part, the other portion of the base being parallel to the said face to provide adequate support when the device is used on a plane surface.

In witness whereof, I have hereunto set my signature in the presence of the two subscribing witnesses.

MANLY M. GILLAM.

Witnesses:
H. D. ASHTON,
W. E. GILLAM.